US008938313B2

(12) United States Patent
Dickins

(10) Patent No.: US 8,938,313 B2
(45) Date of Patent: Jan. 20, 2015

(54) LOW COMPLEXITY AUDITORY EVENT BOUNDARY DETECTION

(75) Inventor: Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 192 days.

(21) Appl. No.: 13/265,683

(22) PCT Filed: Apr. 12, 2010

(86) PCT No.: PCT/US2010/030780
§ 371 (c)(1), (2), (4) Date: Oct. 21, 2011

(87) PCT Pub. No.: WO2010/126709
PCT Pub. Date: Nov. 4, 2010

(65) Prior Publication Data
US 2012/0046772 A1 Feb. 23, 2012

Related U.S. Application Data

(60) Provisional application No. 61/174,467, filed on Apr. 30, 2009.

(51) Int. Cl.
*G06F 17/00* (2006.01)
*G10L 19/025* (2013.01)
(Continued)

(52) U.S. Cl.
CPC ............... *G10L 19/025* (2013.01); *G10L 25/78* (2013.01)
USPC ...................... 700/94; 704/E11.005; 704/200

(58) Field of Classification Search
CPC ......... G10L 15/04; G10L 15/05; G10L 25/03; G10L 15/02; G10L 25/18; G10L 25/87
See application file for complete search history.

(56) References Cited

U.S. PATENT DOCUMENTS 4,935,963 A 6/1990 Jain
5,521,967 A * 5/1996 Novas et al. ............. 379/100.14
(Continued)

FOREIGN PATENT DOCUMENTS

CN 1484756 3/2004
EP 0392412 10/1990
(Continued)

OTHER PUBLICATIONS

Blesser, Barry, "An Ultraminiature Console Compression System with Maximum User Flexibility" May 1972, vol. 20, No. 4, presented at the 41st Convention of the Audio Engineering Society, New York,, pp. 297-301.

*Primary Examiner* — Amal Zenati
*Assistant Examiner* — Thomas Maung

(57) ABSTRACT

An auditory event boundary detector employs down-sampling of the input digital audio signal without an anti-aliasing filter, resulting in a narrower bandwidth intermediate signal with aliasing. Spectral changes of that intermediate signal, indicating event boundaries, may be detected using an adaptive filter to track a linear predictive model of the samples of the intermediate signal. Changes in the magnitude or power of the filter error correspond to changes in the spectrum of the input audio signal. The adaptive filter converges at a rate consistent with the duration of auditory events, so filter error magnitude or power changes indicate event boundaries. The detector is much less complex than methods employing time-to-frequency transforms for the full bandwidth of the audio signal.

15 Claims, 5 Drawing Sheets

(51) Int. Cl.
*G10L 25/78* (2013.01)
*G10L 19/00* (2013.01)

(56) References Cited

U.S. PATENT DOCUMENTS

| | | | |
|---|---|---|---|
| 5,577,159 | A | 11/1996 | Shoham |
| 5,812,966 | A | 9/1998 | Byun |
| 7,263,485 | B2 | 8/2007 | Wark |
| 7,283,954 | B2 | 10/2007 | Crockett |
| 7,461,002 | B2 | 12/2008 | Crockett |
| 7,508,947 | B2 | 3/2009 | Smithers |
| 7,610,205 | B2 | 10/2009 | Crockett |
| 8,019,095 | B2 | 9/2011 | Seefeldt |
| 2004/0044525 | A1 * | 3/2004 | Vinton et al. ................. 704/224 |
| 2007/0291959 | A1 | 12/2007 | Seefeldt |
| 2008/0033585 | A1 | 2/2008 | Zopf |
| 2008/0097750 | A1 | 4/2008 | Seefeldt |
| 2009/0220109 | A1 | 9/2009 | Crockett |
| 2009/0222272 | A1 | 9/2009 | Seefeldt |
| 2009/0290727 | A1 | 11/2009 | Seefeldt |
| 2010/0174540 | A1 | 7/2010 | Seefeldt |
| 2010/0185439 | A1 | 7/2010 | Crockett |
| 2010/0198377 | A1 | 8/2010 | Seefeldt |
| 2010/0198378 | A1 | 8/2010 | Smithers |
| 2011/0009987 | A1 | 1/2011 | Seefeldt |

FOREIGN PATENT DOCUMENTS

| | | |
|---|---|---|
| EP | 1396843 | 3/2004 |
| WO | 2006058958 | 6/2006 |
| WO | 2010/127024 | 11/2010 |
| WO | 2010/129395 | 11/2010 |

* cited by examiner

LOW COMPLEXITY AUDITORY EVENT BOUNDARY DETECTION

CROSS REFERENCE TO RELATED APPLICATIONS

This application claims priority to U.S. Provisional patent application No. 61/174,467 filed 30 Apr. 2009, hereby incorporated by reference in its entirety.

BACKGROUND

An auditory event boundary detector, according to aspects of the present invention, processes a stream of digital audio samples to register the times at which there is an auditory event boundary. Auditory event boundaries of interest may include abrupt increases in level (such as the onset of sounds or musical instruments) and changes in spectral balance (such as pitch changes and changes in timbre). Detecting such event boundaries provides a stream of auditory event boundaries, each having a time of occurrence with respect to the audio signal from which they are derived. Such a stream of auditory event boundaries may be useful for various purposes including controlling the processing of the audio signal with minimal audible artifacts. For example, certain changes in processing of the audio signal may be allowed only at or near auditory event boundaries. Examples of processing that may benefit from restricting processing to the time at or near auditory event boundaries may include dynamic range control, loudness control, dynamic equalization, and active matrixing, such as active matrixing used in upmixing or downmixing audio channels. One or more of the following applications and patents relate to such examples and each of them is hereby incorporated by reference in their entirety:

U.S. Pat. No. 7,508,947, Mar. 24, 2009, "Method for Combining Signals Using Auditory Scene Analysis," Michael John Smithers. Also published as WO 2006/019719 A1, Feb. 23, 2006.

U.S. patent application Ser. No. 11/999,159, Dec. 3, 2007, "Channel Reconfiguration with Side Information," Seefeldt, et al. Also published as WO 2006/132857, Dec. 14, 2006.

U.S. patent application Ser. No. 11/989,974, Feb. 1, 2008, "Controlling Spacial Audio Coding Parameters as a Function of Auditory Events," Seefeldt, et al. Also published as WO 2007/016107, Feb. 8, 2007.

U.S. patent application Ser. No. 12/226,698, Oct. 24, 2008, "Audio Gain Control Using Specific-Loudness-Based Auditory Event Detection," Crockett, et al. Also published as WO 2007/127023, Nov. 8, 2007.

International Application under the Patent Cooperation Treaty Serial No. PCT/US2008/008592, Jul. 11, 2008, "Audio Processing Using Auditory Scene Analysis and Spectral Skewness," Smithers, et al. Published as WO 2009/011827, Jan. 1, 2009.

Alternatively, certain changes in processing of the audio signal may be allowed only between auditory event boundaries. Examples of processing that may benefit from restricting processing to the time between adjacent auditory event boundaries may include time scaling and pitch shifting. The following application relates to such examples and it is hereby incorporated by reference in its entirety:

U.S. patent application Ser. No. 10/474,387, Oct. 7, 2003, "High Quality Time Scaling and Pitch-Scaling of Audio Signals,", Brett Graham Crockett. Also published as WO 2002/084645, Oct. 24, 2002.

Auditory event boundaries may also be useful in time aligning or identifying multiple audio channels. The following applications relate to such examples and it are hereby incorporated by reference in their entirety:

U.S. Pat. No. 7,283,954, Oct. 16, 2007, "Comparing Audio Using Characterizations Based on Auditory Events," Crockett, et al. Also published as WO 2002/097790, Dec. 5, 2002.

U.S. Pat. No. 7,461,002, Dec. 2, 2008, "Method for Time Aligning Audio Signals Using Characterizations Based on Auditory Events," Crockett, et al. Also published as WO 2002/097791, Dec. 5, 2002.

The present invention is directed to transforming a digital audio signal into a related stream of auditory event boundaries. Such a stream of auditory event boundaries related to an audio signal may be useful for any of the above purposes or for other purposes.

SUMMARY OF THE INVENTION

An aspect of the present invention is the realization that the detection of changes in the spectrum of a digital audio signal can be accomplished with less complexity (e.g., low memory requirements and low processing overhead, the latter often characterized by "MIPS," millions of instructions per second) by subsampling the digital audio signal so as to cause aliasing and then operating on the subsampled signal. When subsampled, all of the spectral components of the digital audio signal are preserved, although out of order, in a reduced bandwidth (they are "folded" into the baseband). Changes in the spectrum of a digital audio signal can be detected, over time, by detecting changes in the frequency content of the un-aliased and aliased signal components that result from subsampling.

The term "decimation" is often used in the audio arts to refer to the subsampling or "downsampling" of a digital audio signal subsequent to a lowpass anti-aliasing of the digital audio signal. Anti-aliasing filters are usually employed to minimize the "folding" of aliased signal components from above the subsampled Nyquist frequency into the non-aliased (baseband) signal components below the subsampled Nyquist frequency. See, for example: <http://en.wikipedia.org/wiki/Decimation_(signal_processing)>.

Contrary to normal practice, aliasing according to aspects of the present invention need not be associated with an anti-aliasing filter—indeed, it is desired that aliased signal components are not suppressed but that they appear along with non-aliased (baseband) signal components below the subsampled Nyquist frequency, an undesirable result in most audio processing. The mixture of aliased and non-aliased (baseband) signal components has been found to be suitable for detecting auditory event boundaries in the digital audio signal, permitting the boundary detection to operate over a reduced bandwidth on a reduced number of signal samples than would exist without the aliasing.

An aggressive subsampling (for example, ignoring 15 out of every 16 samples, thus delivering samples at 3 kHz and yielding a decrease in processing complexity of 1/256) of a digital audio signal having a sampling rate of 48 kHz, resulting in a Nyquist frequency of 1.5 kHz, has been found to produce useful results while requiring only about 50 words of memory and less than 0.5 MIPS. These just-mentioned example values are not critical. The invention is not limited to such example values. Other subsampling rates may be useful. Despite the employment of aliasing and the lowered complexity that may result, an increased sensitivity to changes in the digital audio signal may be obtained in practical embodiments when aliasing is employed. Such unexpected results are an aspect of the present invention.

Although the above example assumes a digital input signal having a sampling rate of 48 kHz, a common professional audio sampling rate, that sampling rate is merely an example and is not critical. Other digital input signal may be employed, such as 44.1 kHz, the standard Compact Disc sampling rate. A practical embodiment of the invention designed for a 48 kHz input sampling rate may, for example, also operate satisfactorily at a 44.1 kHz, or vice-versa. For sampling rates more than about 10% higher or lower than the input signal sampling rate for which the device or process is designed, parameters in the device or process may require adjustment to achieve satisfactory operation.

In preferred embodiments of the invention, changes in frequency content of the subsampled digital audio signal may be detected without explicitly calculating the frequency spectrum of the subsampled digital audio signal. By employing such a detection approach, the reduction in memory and processing complexity may be maximized. As explained further below, this may be accomplished by applying a spectrally selective filter, such as a linear predictive filter, to the subsampled digital audio signal. This approach may be characterized as occurring in the time domain.

Alternatively, changes in frequency content of the subsampled digital audio signal may be detected by explicitly calculating the frequency spectrum of the subsampled digital audio signal, such as by employing a time-to-frequency transform. The following application relates to such examples and it is hereby incorporated by reference in its entirety:

U.S. patent application Ser. No. 10/478,538, Nov. 20, 2003, "Segmenting Audio Signals into Auditory Events," Brett Graham Crockett. Also published as WO 2002/097792, Dec. 5, 2002.

Although such a frequency-domain approach requires more memory and processing than does a time-domain approach, because it employs a time-to-frequency transform, it does operate on the above-described subsampled digital audio signal, which has a reduced number of samples, thus providing lower complexity (a smaller transform) than if the digital audio signal had not been downsampled. Thus, aspects of the present invention include both explicitly calculating the frequency spectrum of the subsampled digital audio signal and not doing so.

Detecting auditory event boundaries in accordance with aspects of the invention may be scale invariant so that the absolute level of the audio signal does not substantially affect the event detection or the sensitivity of event detection.

Detecting auditory event boundaries in accordance with aspects of the invention may minimize the false detection of spurious event boundaries for "bursty" or noise-like signal conditions such as hiss, crackle, and background noise As mentioned above, auditory event boundaries of interest include the onset (abrupt increase in level) and pitch or timbre change (change in spectral balance) of sounds or instruments represented by the digital audio samples.

An onset can generally be detected by looking for a sharp increase in the instantaneous signal level (e.g., magnitude or energy). However, if an instrument were to change pitch without any break, such as legato articulation, the detection of a change in signal level is not sufficient to detect the event boundary. Detecting only an abrupt increase in level will fail to detect the abrupt end of a sound source, which may also be considered an auditory event boundary.

In accordance with an aspect of the present invention, a change in pitch may be detected by using an adaptive filter to track a linear predictive model (LPC) of each successive audio sample. The filter, with variable coefficients, predicts what future samples will be, compares the filtered result with the actual signal, and modifies the filter to minimize the error. When the frequency spectrum of the subsampled digital audio signal is static, the filter will converge and the level of the error signal will decrease. When the spectrum changes, the filter will adapt and during that adaptation the level of the error will be much greater. One can therefore detect when changes occur by the level of the error or the extent to which the filter coefficients have to change. If the spectrum is changed faster than the adaptive filter can adapt, this registers as an increase in the level of the error of the predictive filter. The adaptive predictor filter needs to be long enough to achieve the desired frequency selectivity, and be tuned to have an appropriate convergence rate to discriminate successive events in time. An algorithm such as normalized least mean squares or other suitable adaption algorithm is used to update the filter coefficients to attempt to predict the next sample. Although it is not critical and other adaptation rates may be used, a filter adaptation rate set to converge in 20 to 50 ms has been found to be useful. An adaptation rate allowing convergence of the filter in 50 ms allows events to be detected at a rate of around 20 Hz. This is arguably the maximum rate that of event perception in humans.

Alternatively, because a change in the spectrum leads to a change in the filter coefficients, one may detect changes in those coefficients rather than detecting changes in the error signal. However, the coefficients change more slowly as they move towards convergence, so detecting changes in the coefficients adds lag that is not present when detecting changes in the error signal. Although detecting changes in filter coefficients may not require any normalization as may detecting changes in the error signal, detecting changes in the error signal is, in general, simpler than detecting changes in filter coefficients, requiring less memory and processing power.

The event boundaries are associated with an increase in the level of the predictor error signal. The short-term error level is obtained by filtering the error magnitude or power with a temporal smoothing filter. This signal then has the feature of exhibiting a sharp increase at each event boundary. Further scaling and/or processing of the signal can be applied to create a signal that indicates the timing of the event boundaries. The event signal may be provided as a binary "yes or no" or as a value across a range by using appropriate thresholds and limits. The exact processing and output derived from the predictor error signal will depend on the desired sensitivity and application of the event boundary detector.

An aspect of the present invention is that auditory event boundaries may be detected by relative changes in spectral balance rather than the absolute spectral balance. Consequently, one may apply the aliasing technique described above in which the original digital audio signal spectrum is divided into smaller sections and folded over each other to create a smaller bandwidth for analysis. Thus, only a fraction of the original audio samples needs to be processed. This approach has the advantage of reducing the effective bandwidth, thereby reducing the required filter length. Because only a fraction of the original samples need to be processed, the computational complexity is reduced. In the practical embodiment mentioned above, a subsampling of 1/16 is used, creating a computational reduction of 1/256. By subsampling a 48 kHz signal down to 3000 Hz, useful spectral selectivity may be achieved with a 20 tap predictive filter, for example. In the absence of such subsampling, a predictive filter having in the order of 320 taps would have been required. Thus, a substantial reduction in memory and processing overhead may be achieved.

An aspect of the present invention is the recognition that subsampling so as to cause aliasing does not adversely affect predictor convergence and the detection of auditory event boundaries. This may be because most auditory events are harmonic and extend over many periods and because many of the auditory event boundaries of interest are associated with changes in the baseband, unaliased, portion of the spectrum.

BRIEF DESCRIPTION OF THE DRAWINGS

In FIGS. 5A-F, the digital input signal in FIG. 5A represents three tone bursts in which there is a step-wise increase in amplitude from tone burst to tone burst and in which the pitch is changed midway through each burst.

Figure 1:
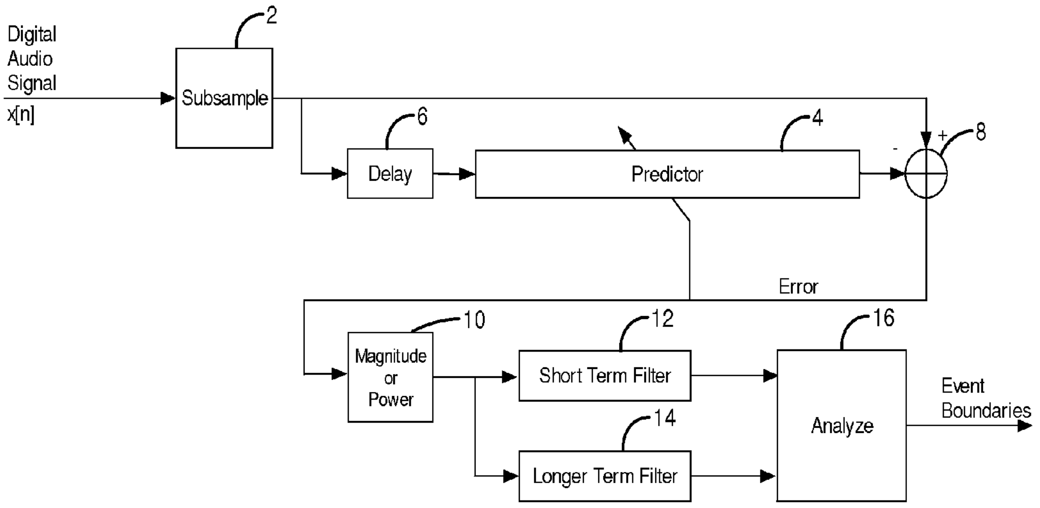
FIG. 1 is a schematic functional block diagram showing an example of an auditory event boundary detector according to aspects of the present invention.

The exemplary set of waveforms of FIGS. 6A-F differ from those of FIGS. 5A-F in that the digital audio signal represents two sequences of piano notes.

The exemplary set of waveforms of FIGS. 7A-F differ from those of FIGS. 5A-F and FIGS. 6A-F in that the digital audio signal represents speech in the presence of background noise.

DETAILED DESCRIPTION OF THE INVENTION

Referring now to the various figures, FIGS. 1-4 are schematic functional block diagrams showing examples of an auditory event boundary detectors or detector processes according to aspects of the present invention. In those figures, the use of the same reference numeral indicates that the device or function may be substantially identical to another or others bearing the same reference numeral. Reference numerals bearing primed numbers (e.g., "10'") indicate that the device or function is similar in structure or function but may be a modification of another or others bearing the same basic reference numeral or primed versions thereof. In the examples of FIGS. 1-4, changes in frequency content of the subsampled digital audio signal are detected without explicitly calculating the frequency spectrum of the subsampled digital audio signal.

FIG. 1 is a schematic functional block diagram showing an example of an auditory event boundary detector according to aspects of the present invention. A digital audio signal, comprising a stream of samples at a particular sampling rate, is applied to an alias-creating subsampler or subsampling function ("Subsample") 2. The digital audio input signal may be denoted by a discrete time sequence x[n] which may have been sampled from an audio source at some sampling frequency $f_s$. For a typical sampling rate of 48 kHz or 44.1 kHz, Subsample 2 may reduce the sample rate by a factor of 1⁄16 by discarding 15 out of every 16 audio samples. The Subsample 2 output is applied via a delay or delay function ("Delay") 6 to an adaptive predictive filter or filter function ("Predictor") 4, which functions as a spectrally selective filter. Predictor 4 may be, for example, an FIR filter or filtering function. Delay 6 may have a unit delay (at the subsampling rate) in order to assure that the Predictor 4 does not use the current sample. Some common expressions of an LPC prediction filter include the delay within the filter itself. See, for example: http://en.wikipedia.org/wiki/Linear_prediction>.

Still referring to FIG. 1, an error signal is developed by subtracting the Predictor 4 output from the input signal in a subtractor or subtraction function 8 (shown symbolically). The Predictor 4 responds both to onset events and spectral change events. While other values will also be acceptable, for original audio at 48 kHz subsampled by 1⁄16 to create samples at 3 kHz, a filter length of 20 taps has been found to be useful. An adaptive update may be carried out using normalized least mean squares or another similar adaption scheme to achieve a desired convergence time of 20 to 50 ms, for example. The error signal from the Predictor 4 is then either squared (to provide the error signal's energy) or absolute valued (to provide the error signal's magnitude) in a "Magnitude or Power" device or function 10 (the absolute value is more suited to a fixed-point implementation) and then filtered in a first temporal smoothing filter or filtering function ("Short Term Filter") 12 and a second temporal smoothing filter or filtering function ("Longer Term Filter") 14 to create first and second signals, respectively. The first signal is a short-term measure of the predictor error, while the second signal is a longer term average of the filter error. Although it is not critical and other values or types of filters may be used, a lowpass filter with a time constant in the range of 10 to 20 ms has been found to be useful for the first temporal smoothing filter 12 and a lowpass filter with a time constant in the range of 50 to 100 ms has been found to be useful for the second temporal smoothing filter 14.

The first and second smoothed signals are compared and analyzed in an analyzer or analyzing function ("Analyze") 16 to create a stream of auditory event boundaries that are indicated by a sharp increase in the first signal relative to the second. One approach for creating the event boundary signal is to consider the ratio of the first to the second signal. This has the advantage of creating a signal that is not substantially affected by changes in the absolute scale of the input signal. After the ratio is taken (a division operation), the value may be compared to a threshold or range of values to produce a binary or continuous-valued output indicating the presence of an event boundary. While the values are not critical and will depend on the application requirements, a ratio of the short-term to long-term filtered signals greater than 1.2 may suggest a possible event boundary while a ratio greater than 2.0 may be considered to definitely be an event boundary. A single threshold for a binary event output may be employed, or, alternatively values may be mapped to an event boundary measure having a the range of 0 to 1, for example.

It is evident that other filter and/or processing arrangements may be used to identify the features representing event boundaries from the level of the error signal. Also, the sensitivity and range of the event boundary outputs may be adapted to the device(s) or process(es) to which the boundary outputs are applied. This may be accomplished, for example, by changing filtering and/or processing parameters in the auditory event boundary detector.

Since the second temporal smoothing filter ("Longer Term Filter") 14 has a longer time constant, it may use as its input the output of the first temporal smoothing filter ("Short Term Filter") 12. This may allow the second filter and the analysis to be carried out at a lower sampling rate.

Improved detection of event boundaries may be obtained if the second smoothing filter 14 has a longer time constant for increases and the same time constant for decreases in level as smoothing filter 12. This reduces delay in detecting event boundaries by urging the first filter output to be equal to or greater than the second filter output.

The division or normalization in Analyze 16 need only be approximate to achieve an output that is substantially scale invariant. To avoid a division step, a rough normalization may be achieved by a comparison and level shift. Alternatively, normalization may be performed prior to Predictor 4, allowing the prediction filter to operate on smaller words.

To achieve a desired reduction in sensitivity to events of a noise-like nature, one may use the state of the predictor to provide a measure of the tonality or predictability of the audio signal. The measure may be derived from the predictor coefficients to emphasize events that occur when the signal is more tonal or predictable, and de-emphasize events that occur in noise-like conditions.

The adaptive filter 4 may be designed with a leakage term causing the filter coefficients to decay over time when not converging to match a tonal input. Given a noise-like signal, the predictor coefficients decay towards zero. Thus, a measure of the sum of the absolute filter values, or filter energy, may provide a reasonable measure of spectral skew. A better measure of skew may be obtained using only a subset of the filter coefficients; in particular by ignoring the first few filter coefficients. A sum of 0.2 or less may be considered to represent low spectral skew and may thus be mapped to a value of 0 while a sum of 1.0 or more may be considered to represent significant spectral skew and thus may be mapped to a value of 1. The measure of spectral skew may be used to modify the signals or thresholds used to create the event boundary output signal so that the overall sensitivity is lowered for noise-like signals.

Figure 2:
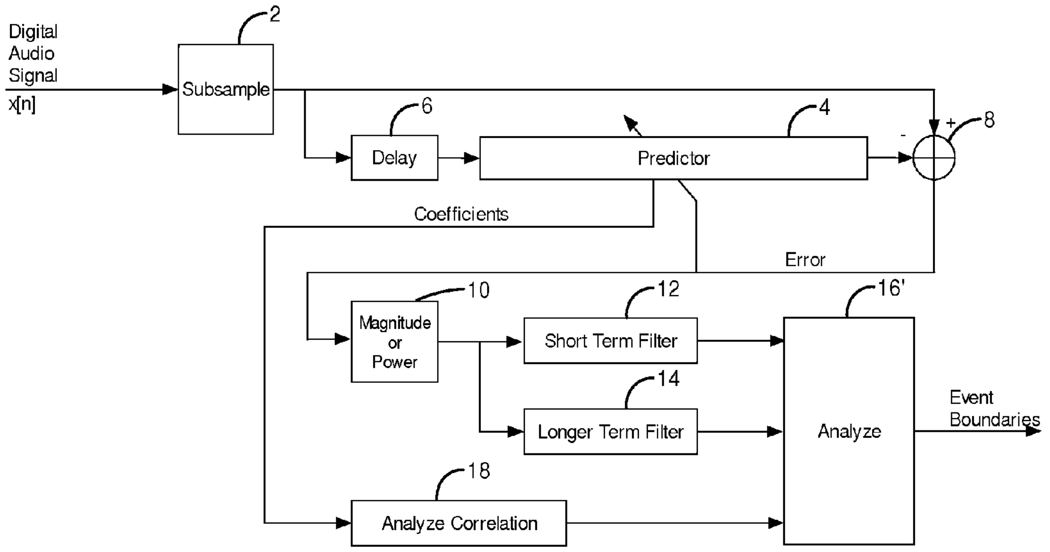
FIG. 2 is a schematic functional block diagram showing another example of an auditory event boundary detector according to aspects of the present invention. The example of FIG. 2 differs from the example of FIG. 1 in that it shows the addition of a third input to Analyze 16' for obtaining a measure of the degree of correlation or tonality in the subsampled digital audio signal.

FIG. 2 is a schematic functional block diagram showing another example of an auditory event boundary detector according to aspects of the present invention. The example of FIG. 2 differs from the example of FIG. 1 at least in that it shows the addition of a third input to Analyze 16' (designated by a prime symbol to indicate a difference from Analyze 16 of FIG. 1). This third input, which may be referred to as a "Skew" input, may be obtained from an analysis of the Predictor coefficients in an analyzer or analysis function ("Analyze Correlation") 18 to obtain a measure of the degree of correlation or tonality in the subsampled digital audio signal, as described in the two paragraphs just above.

To create the event boundary signal from the three inputs, the Analyze 16' processing may operate as follows. First, it takes the ratio of the output of smoothing filter 12 to the output of smoothing filter 14, subtracts unity and forces the signal to be greater than or equal to zero. This signal is then multiplied by the "Skew" input that ranges from 0 for noise like signals to 1 for tonal signals. The result is an indication of the presence of an event boundary with a value greater than 0.2 suggesting a possible event boundary and a value greater than 1.0 indicating a definite event boundary. As in the FIG. 1 example described above, the output may be converted to a binary signal with a single threshold in this range or converted to a confidence range. It is evident that wide range of values and alternative methods of deriving the final event boundary signal may also be appropriate for some uses.

Figure 3:
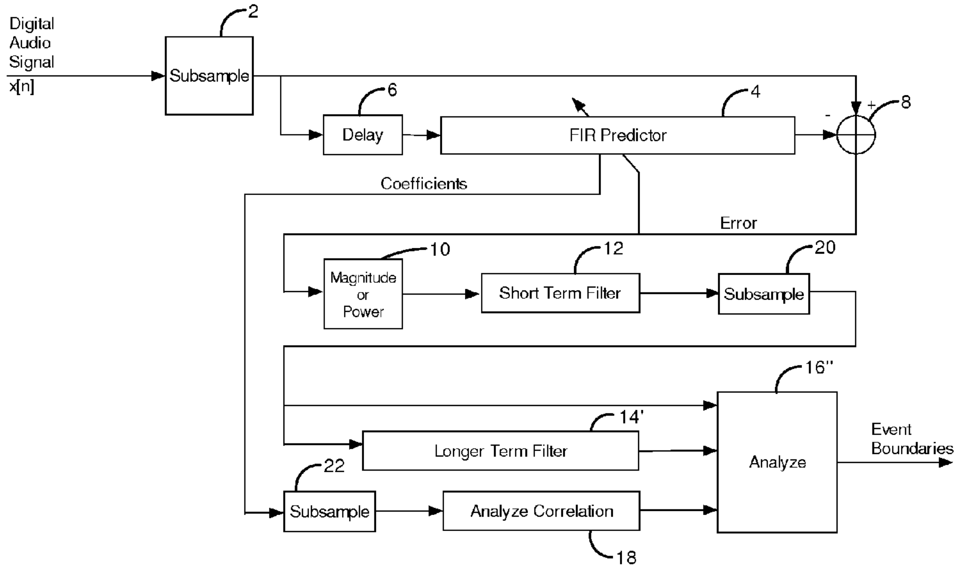
FIG. 3 is a schematic functional block diagram showing yet another example of an auditory event boundary detector according to aspects of the present invention. The example of FIG. 3 differs from the example of FIG. 2 in that it has an additional subsampler or subsampling function.

FIG. 3 is a schematic functional block diagram showing yet another example of an auditory event boundary detector according to aspects of the present invention. The example of FIG. 3 differs from the example of FIG. 2 at least in that it has an additional subsampler or subsampling function. If the processing associated with the event boundary detection requires an event boundary output less frequently than the subsampling provided by Subsample 2, an additional subsampler or subsample function ("Subsample") 20 may be provided following Short Term Filter 12. For example, a 1/16 reduction in the Subsample 2 sample rate may be further reduced by 1/16, to provide a potential event boundary in the output stream of event boundaries every 256 samples. The second smoothing filter, Longer Term Filter 14', receives the output of Subsample 20 to provide the second filter input to Analyze 16". Because the input to smoothing filter 14' is now already lowpass filtered by smoothing filter 12, and subsampled by 20, the filter characteristics of 14' should be modified accordingly. A suitable configuration is a time constant of 50 to 100 ms for increases in the input and an immediate response to decreases in the input. To match the reduced sample rates of the other inputs to Analyze 16", the coefficients of the Predictor should also be subsampled by the same subsampling rate (1/16 in the example) in a further subsampler or subsampling function ("Subsample") 22 to produce the Skew input to Analyze 16" (designated by a double prime symbol to indicate a difference from Analyze 16 of FIG. 1 and Analyze 16'; of FIG. 2). Analyze 16" is substantially similar to Analyze 16' of FIG. 2 with minor changes to adjust for the lower sampling rate. The additional decimation stage 20 significantly lowers computation. At the output of Subsample 20, the signals represent slow time varying envelope signals, so aliasing is not a concern.

Figure 4:
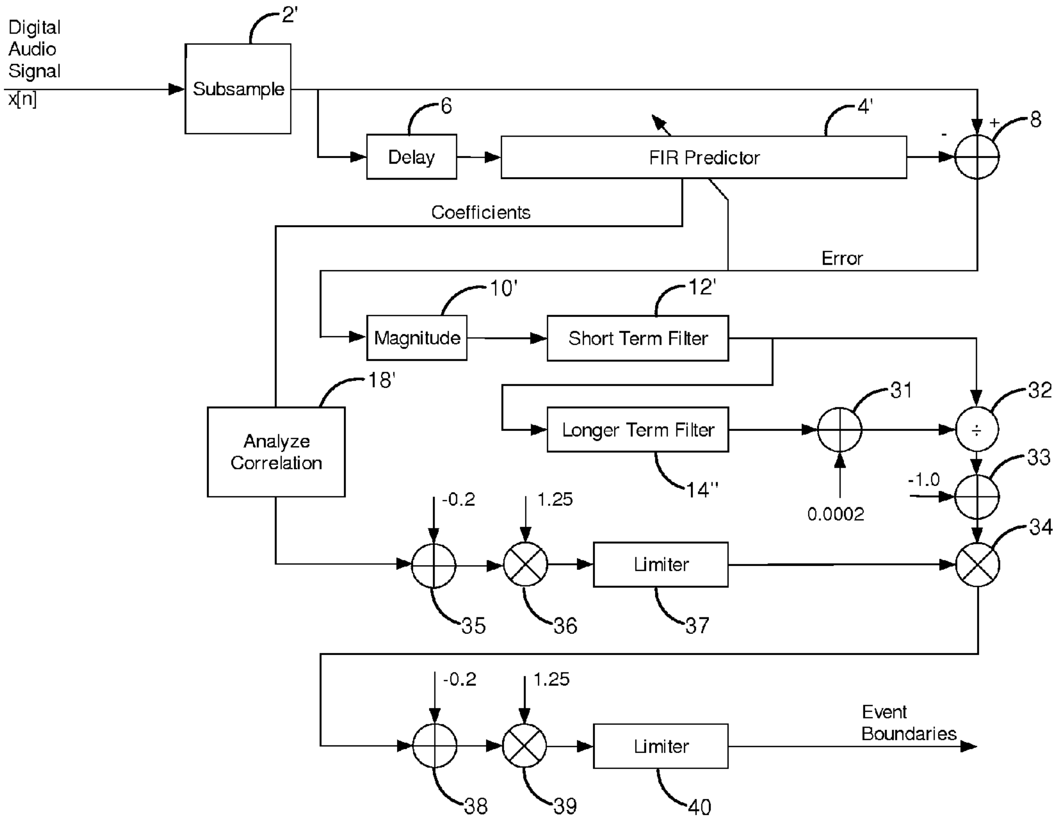
FIG. 4 is a schematic functional block diagram showing a more detailed version of the example of FIG. 3.

FIG. 4 is a specific example of an event boundary detector according to aspects of the present invention. This particular implementation was designed to process incoming audio at 48 kHz with the audio sample values in the range of −1.0 to +1.0. The various values and constants embodied in the implementation are not critical but suggest a useful operation point. This figure and the following equations detail the specific variant of the process and the present invention used to create the subsequent figures with example signals. The incoming audio x[n] is subsampled by taking every $16^{th}$ sample by the subsampling function ("Subsample") 2'

$$x'[n]=[16n].$$

The delay function ("Delay") 6 and the predictor function ("FIR Predictor") 4' create an estimate of the current sample using a 20 tap FIR filter over previous samples $$y[n]=\sum_{i=1}^{20} w_i[n]x'[n-i]$$

with $w_i[n]$ representing the $i^{th}$ filter coefficient at subsample time n. The subtraction function 8 creates the prediction error signal $$e[n]=x'[n]-y[n]$$

This is used to update the Predictor 4' coefficients according to a normalized least mean squares adaption process with the addition of a leakage term to stabilize the filter $$w_i[n+1] = 0.999w_i[n] + \frac{0.05e[n]x'[n-i]}{\sum_{j=1}^{20} x'[n-j]^2 + .000001}$$

where the denominator is a normalizing term comprising the sum of the squares of the previous 20 input samples and the addition of a small offset to avoid dividing by zero. The variable j is used to index the previous 20 samples, x'[n−j] for j=1 to 20. The error signal is then passed through a magnitude function ("Magnitude") 10' and first temporal filter ("Short Term Filter") 12', which is a simple first order low pass filter, to create first filtered signal $$f[n]=0.99f[n-1]+0.01|e[n]|$$

This signal is then passed through a second temporal filter ("Longer Term Filter") 14", which has a first order low pass for increasing input, and immediate response for decreasing input, to create a second filtered signal $$g[n] = \begin{cases} 0.99g[n-1] + 0.01f[n] & f[n] > g[n-1] \\ f[n] & f[n] \le g[n-1] \end{cases}$$

The coefficients of the Predictor 4' are used to create an initial measure of the tonality ("Analyze Correlation") 18' as the sum of the magnitude of the third through to the final filter coefficient $$s[n] = \sum_{i=3}^{20} |w_i[n]|$$

This signal is passed through an offset 35, scaling 36 and limiter ("Limiter") 37 to create the measure of skew $$s'[n] = \begin{cases} 0 & s[n] < 0.2 \\ 1.25(s[n]-0.2) & 0.2 \le s[n] \le 1 \\ 1 & s[n] < 1 \end{cases}$$

The first and second filtered signals and the measure of skew are combined with an addition 31, division 32, subtraction 33, and scaling 34, to create an initial event boundary indication signal $$v = \left(\frac{f[n]}{g[n] + .0002} - 1.0\right)s'[n]$$

Finally, this signal is passed through an offset 38, scaling 39 and limiter ("Limiter") 40 to create an event boundary signal ranging from 0 to 1

$$v'[n] = \begin{cases} 0 & v[n] < 0.2 \\ 1.25(v[n]-0.2) & 0.2 \le v[n] \le 1 \\ 1 & v[n] < 1 \end{cases}$$

The similarity of values in the two temporal filters 12' and 14" and the two signal transforms 35, 36, 37 and 38, 39, 40 do not represent a fixed design or constraint of the system.

FIGS. 5A-F, 6A-F and 7A-F are exemplary sets of waveforms useful in understanding the operation of an auditory event boundary detection device or method in accordance with the example of FIG. 4. Each of the sets of waveforms is time-aligned along to a common time scale (horizontal axis). Each waveform has its own level scale (vertical axis), as shown.

Figure 5:
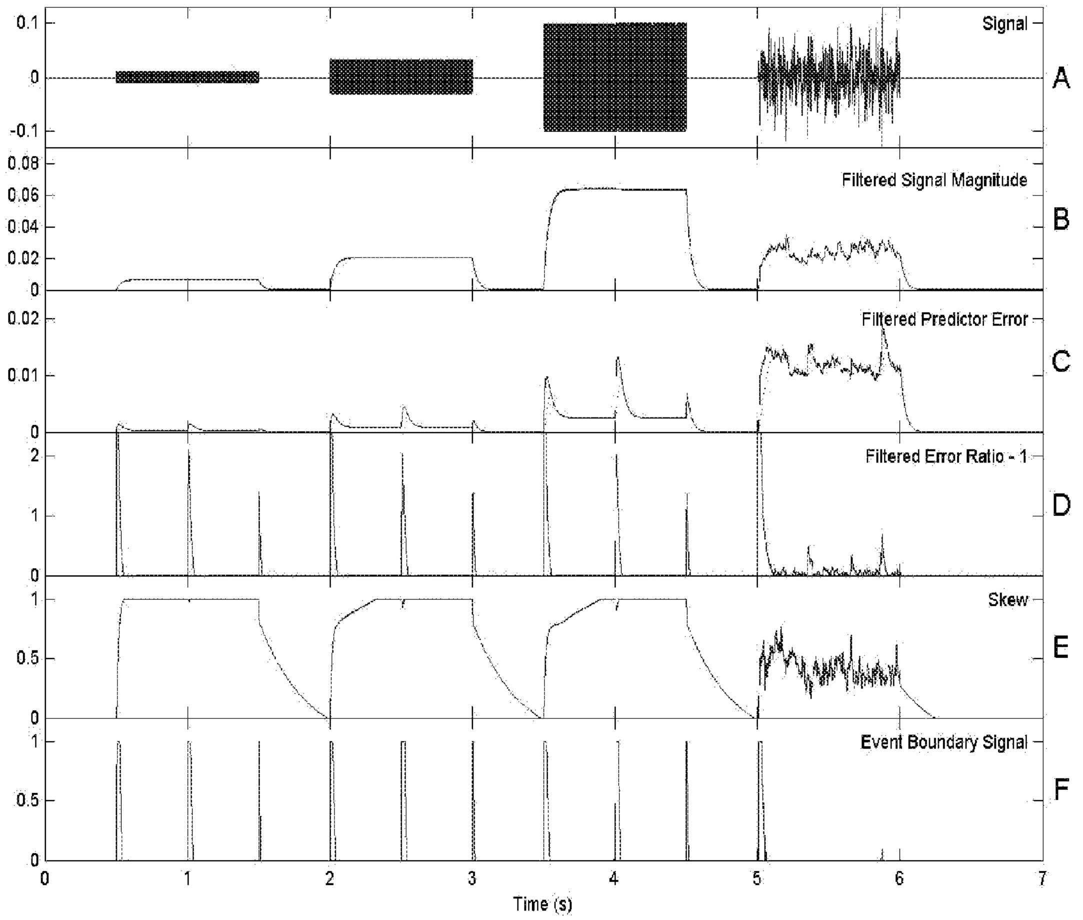
FIGS. 5A-F, 6A-F and 7A-F are exemplary sets of waveforms useful in understanding the operation of an auditory event boundary detection device or method in accordance with the example of FIG. 4. Each of the sets of waveforms is time-aligned along to a common time scale (horizontal axis). Each waveform has its own level scale (vertical axis), as shown.

Referring first to the exemplary set of waveforms in FIGS. 5A-F, the digital input signal in FIG. 5A represents three tone bursts in which there is a step-wise increase in amplitude from tone burst to tone burst and in which the pitch is changed midway through each burst. It can be seen that a simple magnitude measure, shown in FIG. 5B, does not detect the change in pitch. The error from the predictive filter detects the onset, pitch change and end of the tone burst, however the features are not clear and depend on the input signal level (FIG. 5C). By scaling as described above, a set of impulses is obtained that mark the event boundaries and remain independent of the signal level (FIG. 5D). However, this signal can produce unwanted event signals for the final noise-like input. The Skew measure (FIG. 5E) obtained from the absolute sum of all but the first two filter taps is then used to lower the sensitivity events occurring without strong spectral components. Finally, the scaled and truncated stream of event boundaries (FIG. 5F) is obtained by Analysis.

Figure 6:
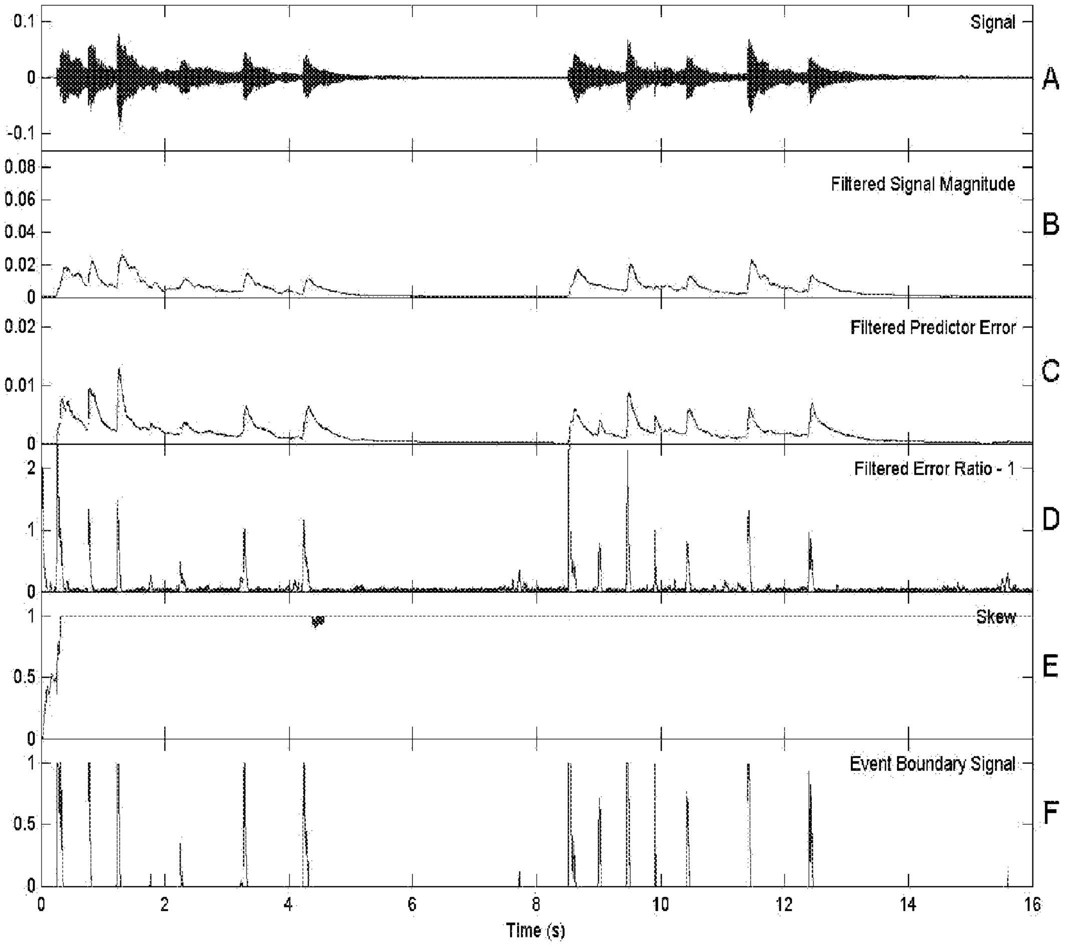
Figure 7:
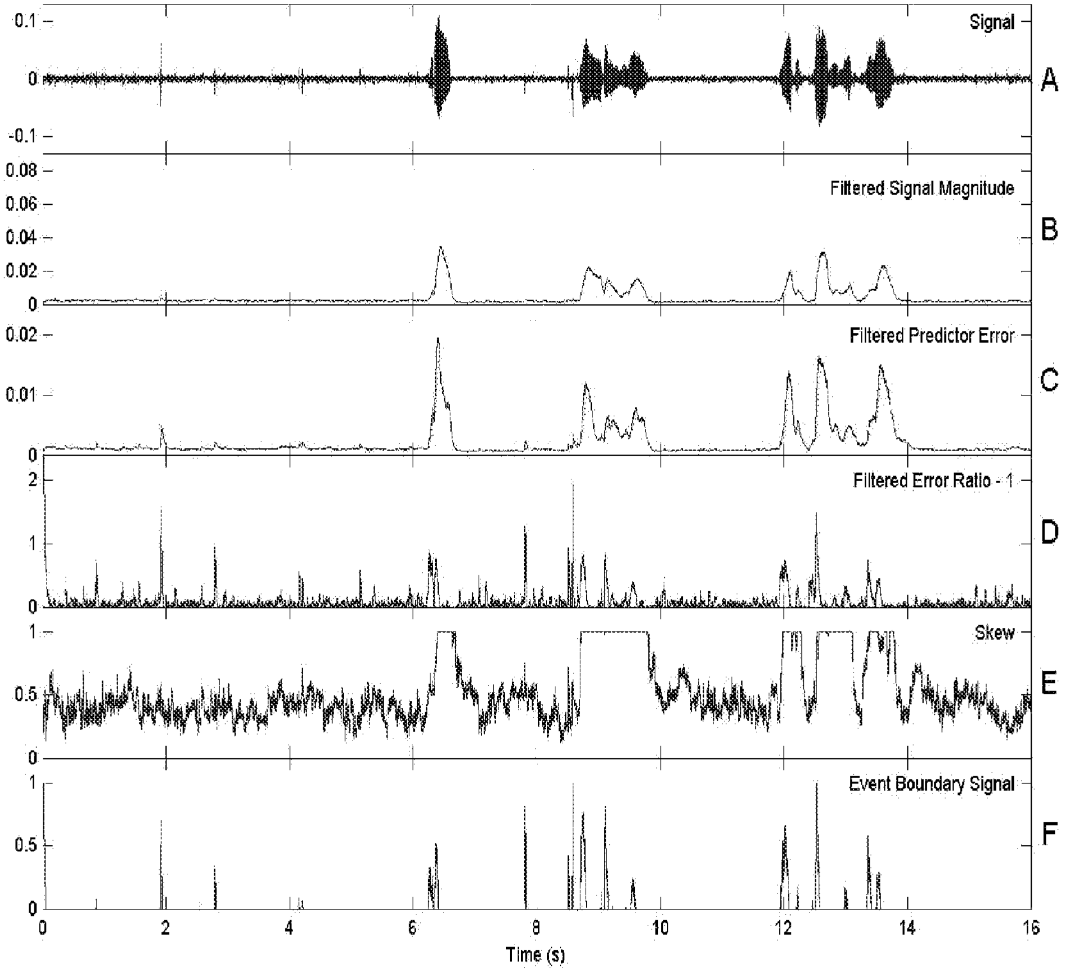

The exemplary set of waveforms of FIGS. 6A-F differ from those of FIGS. 5A-F in that the digital audio signal represents two sequences of piano notes. This demonstrates, as does the exemplary waveforms of FIGS. 5A-F, how the prediction error is able to identify the event boundaries even when they are not apparent in the magnitude envelope (FIG. 6B). In this set of examples, the end notes fade out gradually so no event is signaled at the end of the progression.

The exemplary set of waveforms of FIGS. 7A-F differ from those of FIGS. 5A-F and FIGS. 6A-F in that the digital audio signal represents speech in the presence of background noise. The Skew factor allows the events in the background noise to be suppressed because they are broadband in nature, while the voiced segments are detailed with the event boundaries.

The examples show that the sudden end of any tonal sound is detected. Soft decays of a sound do not register an event boundary because there is no definite boundary (just a fade out). Although a sudden end of a noise-like sound may not register an event, most speech or musical events that have a sudden end will have some spectral change or pinch-off event at the end that will be detected.

Implementation

The invention may be implemented in hardware or software, or a combination of both (e.g., programmable logic arrays). Unless otherwise specified, the algorithms included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described herein may be order independent, and thus can be performed in an order different from that described.

The invention claimed is:

1. A method for processing a digital audio signal, comprising:

- deriving a subsampled digital audio signal by subsampling the digital audio signal so that its subsampled Nyquist frequency is within the bandwidth of the digital audio signal, causing signal components in the digital audio signal above the subsampled Nyquist frequency to appear below the subsampled Nyquist frequency in the subsampled digital audio signal,
- detecting changes over time in the spectral balance of the unaliased and aliased signal components that result from subsampling the digital audio signal to derive a stream of auditory event boundaries, wherein said changes over time in the spectral balance are detected using an adaptive filter,
- controlling the processing of the audio signal using the stream of auditory event boundaries, and
- wherein detecting a change over time in the frequency content spectral balance of the subsampled digital audio signal includes predicting the current sample from a set of previous samples, generating a prediction error signal, and detecting when a change over time in the error signal level exceeds a threshold, wherein the threshold is adaptive.

2. The method of claim 1 wherein an auditory event boundary is detected when a change over time in the spectral balance of the subsampled digital audio signal exceeds a threshold.

3. The method of claim 1 wherein sensitivity to changes over time in the spectral balance of the subsampled digital audio signal is lowered for digital audio signals representing noise-like signals.

4. The method of claim 1 wherein changes over time in the spectral balance of the subsampled digital audio signal are detected without explicitly calculating the frequency spectrum of the subsampled digital audio signal.

5. The method of claim 1 wherein changes over time in the spectral balance of the subsampled digital audio signal are derived by applying a spectrally selective adaptive filter to the subsampled digital audio signal.

6. The method of claim 1 wherein changes over time in the spectral balance of the subsampled digital audio signal are detected by a process that includes explicitly calculating the frequency spectrum of the subsampled digital audio signal.

7. The method of claim 6 wherein explicitly calculating the spectral balance of the subsampled digital audio signal comprises applying a time-to-frequency transformation to the subsampled digital audio signal and the process further includes detecting changes over time in frequency-domain representations of the subsampled digital audio signal.

8. The method of claim 1 wherein a detected auditory event boundary has a binary value indicating the presence or absence of the boundary.

9. The method of claim 1 wherein a detected auditory event boundary has a range of values indicating the absence of a boundary or the presence and strength of the boundary.

10. Apparatus comprising means adapted to perform the method of claim 1.

11. A computer program, stored on a non-transitory computer-readable medium, for causing a computer to perform the method of claim 1.

12. A non-transitory computer-readable medium storing thereon the computer program performing the method of claim 1.

13. The method of claim 1 wherein said processing of the audio signal includes one or more of dynamic range control, loudness control, dynamic equalization, and active matrixing.

14. The method of claim 1 wherein the subsampling is aggressive.

15. The method of claim 14 wherein the digital audio signal has a sampling rate of 44.1 kHz or 48 kHz and the subsampling reduces the sample rate by a factor of 1/16.

* * * * *